United States Patent
Butler (12) 
(10) Patent No.: US 6,533,941 B2
(45) Date of Patent: Mar. 18, 2003

(54) FLOW THROUGH DRAIN FILTER FOR A STORMWATER OR WASTEWATER CATCH BASIN

(76) Inventor: George R. Butler, 23 Baldwin Ave., Crockett, CA (US) 94525

( * ) Notice: Subject to any disclaimer, the term of this patent is extended or adjusted under 35 U.S.C. 154(b) by 0 days.

(21) Appl. No.: 09/930,643

(22) Filed: Aug. 14, 2001

(65) Prior Publication Data

US 2003/0034286 A1 Feb. 20, 2003

(51) Int. Cl.[7] ............................... C02F 1/42; G21F 9/04
(52) U.S. Cl. ........................ 210/681; 210/691; 210/747; 210/163; 210/170; 210/254; 210/266; 210/284; 210/338; 404/4
(58) Field of Search ................................ 210/163, 164, 210/170, 254, 265, 266, 283, 284, 282, 338, 489, 660, 681, 691, 747; 404/4, 5

(56) References Cited

U.S. PATENT DOCUMENTS

| | | | | |
|---|---|---|---|---|
| 4,261,823 A | * | 4/1981 | Gallagher et al. | 210/164 |
| 5,391,295 A | * | 2/1995 | Wilcox et al. | 210/170 |
| 5,496,468 A | | 3/1996 | Cormier | |
| 5,707,527 A | | 1/1998 | Knutson | |
| 5,826,762 A | * | 10/1998 | Bamer et al. | 210/284 |
| 6,027,639 A | * | 2/2000 | Lenhart, Jr. et al. | 210/170 |
| 6,077,423 A | * | 6/2000 | Roy et al. | 210/170 |
| 6,099,723 A | * | 8/2000 | Morris et al. | 210/170 |
| 6,217,757 B1 | * | 4/2001 | Fleischmann | 210/163 |
| 6,337,025 B1 | * | 1/2002 | Clemenson | 210/163 |
| 6,406,218 B1 | * | 6/2002 | Olson | 404/4 |
| 2002/0117435 A1 | * | 8/2002 | Pank | 210/170 |

OTHER PUBLICATIONS

Remco Engineering brochures (2)—Power Purge Deionization Systems & The Remco Metal Recovery Ion Exchange Process.
Brochure– The Streamguard Catch basin Insert.
Brochure– Aqua Treatment Syatems Inc.

* cited by examiner

*Primary Examiner*—Christopher Upton
(74) *Attorney, Agent, or Firm*—Bruce & McCoy; Ernest H. McCoy (57) ABSTRACT

A flow through drain filter for removing trash, sediment, liquid hydrocarbons, and metal ions comprised of at least four concentric screens having a deionizing filter material disposed between an exit screen and a second middle inner screen and hydrophobic and liquid hydrocarbon absorbent material disposed between first and second middle screens and a sediment capture space between the first middle screen and a trash exclusion intake screen.

12 Claims, 7 Drawing Sheets

FLOW THROUGH DRAIN FILTER FOR A STORMWATER OR WASTEWATER CATCH BASIN

BACKGROUND OF THE INVENTION

1. Field of the Invention

The present invention relates to water filters for sewer system drains. More particularly, it is related to flow through filters for stormwater or wastewater catch basins or containment vessels having a gravity flow outlet drain. The invention is disposed at a sewer system inlet catch basin and removes trash, sediment, liquid hydrocarbons, and free metal ions that are suspended, floating, or dissolved in the water.

2. Description of the Prior Art

Stormwater and wastewater drain guards for sewer system inlets normally include simply a grate to prevent the influx of large debris. The terms "storm sewer," "drain," or "dedicated filter basin" are intended to include a sewer that intakes or processes stormwater, surface water, street wash, wastewater, industrial runoff, and other effluent waters or drainage but excludes sanitary wastewater.

Federal regulations and state standards now mandate the removal of sediment and hydrocarbons from stormwater runoff or wastewater before it is released into the environment. However, a further component of stormwater or wastewater which it is also desirable to remove, but without substantially changing the pH of the water, is free metal ions.

One commercially available system for partially achieving these results, used in connection with new and existing stormwater drainage sewer inlets, is a contaminant absorbing internal trough apparatus. The trough area of the apparatus is disposed in the drain inlet and provided for the retention of a removable and replaceable absorbent filter material in a filter cartridge which collects petroleum pollutants or liquid hydrocarbons. It is claimed that the trough apparatus, when compared to oil/water separators, is the only known accepted alternative apparatus for removing petroleum pollutants and sediments but which may be installed at a fraction of the cost of oil/water separators with lower maintenance costs.

The described prior art apparatus, however, can only function in a one-way direction of water flow throughput, and it does not remove free metal ions. The present invention achieves the same claimed results of the prior art with different and equally inexpensive, if not less costly, apparatus with comparably low maintenance costs, as well as removing metal ions, and, especially important, it is adoptable for double direction flow.

SUMMARY OF THE INVENTION

The present invention is a flow through drain filter assembly for a stormwater or wastewater catch basin forming a sewer system inlet and having a gravity flow basin outlet drain. The filter is a double flow design whereby the water intake to the basin can either be from the top periphery around the basin, or from a side inlet pipe, and the outlet for the basin can either be a side outlet or bottom drain. The filter assembly is formed for excluding floating trash and capturing sediment, liquid hydrocarbons, and free metal ions washed into the sewer system inlet by stormwater or wastewater.

The filter assembly comprises at least four concentric spaced apart screens disposed in the assembly and arranged to filter water flowing to the outlet. The assembly includes a water intake trash exclusion screen and a water exit screen and first and second middle screens. The assembly includes deionizing resin beads disposed between the water exit screen and the second middle screen, and particulate filter material which is hydrophobic and a liquid hydrocarbon absorber disposed between the first and second middle screens. Water flowing into the sewer system inlet passes through the filter assembly, and trash is separated from the stormwater by the trash exclusion screen. Sequentially, suspended sediment washed thereinto therewith is precipitated to the bottom of the basin between the trash exclusion screen and the first middle screen; liquid hydrocarbons suspended in the stormwater are absorbed by contact with the particulate matter disposed between the first and second middle screens; and free ions are deionized by contact with the resin beads disposed between the second middle and the exit screens by the outflow movement of the stormwater in the basin through the screens to the outlet. As a result, trash, sediment, hydrocarbons, and free ions are sequentially separated, precipitated, absorbed, and deionized by the assembly and its ingredients and prevented from flowing through the outlet and into the sewer system.

The present invention also includes the method for removing trash, sediment, liquid hydrocarbons, and free metal ions from stormwater or wastewater flowing into sewer system inlets having catch basins with an outlet drain. The method comprises the steps of interposing a filter in the catch basin between the sewer system inlet and the outlet drain, then sequentially removing from the water flow through the filter: trash in the water flow by a water intake trash exclusion screen; sediment in the water flow by interposing a water permeable sediment barrier between concentric first and second middle screens in the filter; liquid hydrocarbons in the water flow by interposing a particulate filter which is hydrophobic and liquid hydrocarbon absorbent between the first and second middle screens; and metal ions by interposing in the water flow a deionizing resin bead barrier between the second middle screen and a water exit screen. The trash screen, the sediment barrier, the liquid hydrocarbon particulate filter, and the deionizing resin bead barrier are arranged in concentric relation for effecting the sequential element removal.

OBJECTS OF THE INVENTION

It is therefore an important object of the present invention to provide a new and novel drain filter for a sewer system inlet which separates out trash and sediment, captures liquid hydrocarbons, and removes free metal ions that are carried along in, or that are suspended or floating in, or that are present in solution, in stormwater runoff or wastewater.

It is another object of the present invention to provide an inexpensive, long-lived, light-weight, stormwater or wastewater drain filter for a catch basin forming a sewer system inlet which can be removed and/or disassembled for cleaning, installation of fresh filter material, and removal of saturated filter material for regeneration.

It is a further object of the present invention to provide a stormwater or wastewater drain filter for a sewer system inlet which sequentially excludes trash, precipitates sediment, and captures liquid hydrocarbons and metal ions floating or carried along, in stormwater runoff or wastewater and which can be installed in conjunction with either presently existing or new sewer system inlets or installed in dedicated catch basins for water treatment It is still another object of the present invention to provide a universal stormwater or wastewater double flow drain filter which sequentially removes trash, sediment, liquid hydrocarbons, and metal ions which can be installed in sewer inlet catch basins having water inflow to the filter either through the top center or from the sides of the basin and an outflow drain to a sewer system disposed either at the bottom or the sides thereof.

And it is yet a further object of the present invention to provide a new and novel method for sequentially removing trash, sediment, liquid hydrocarbons, and free metal ions from catch basins having an inflow to the filter either through the center or from the sides thereof and an outflow drain to a sewer system disposed either at the bottom or sides thereof.

Other objects and advantages of the present invention win become apparent when the apparatus and method of the present invention are considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figures 1, 2:
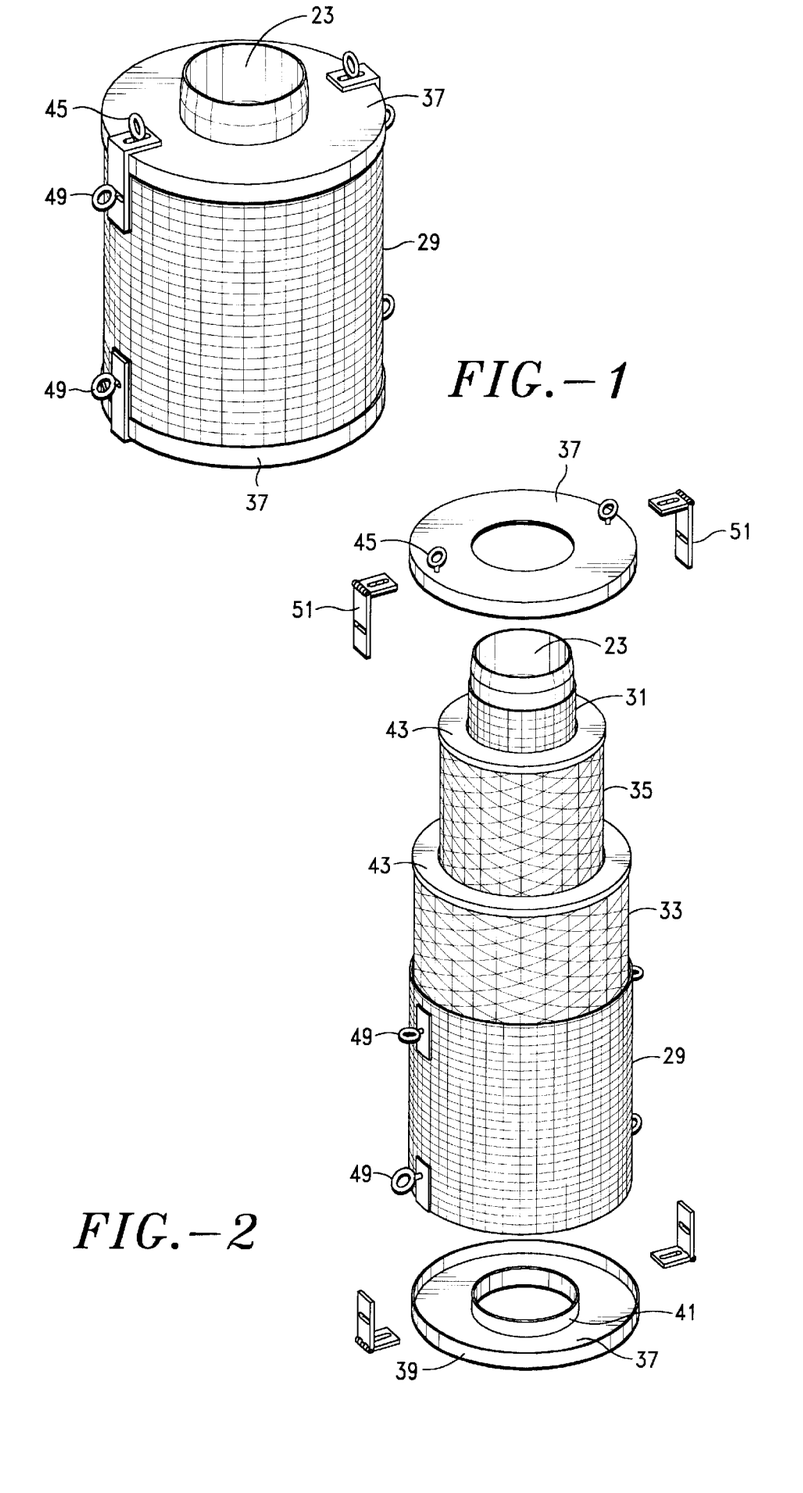
FIG. 1 is a perspective view of an assembled flow through drain filter of the present invention for a stormwater or wastewater catch basin.
FIG. 2 is a partial disassembly view thereof.
Figure 3:
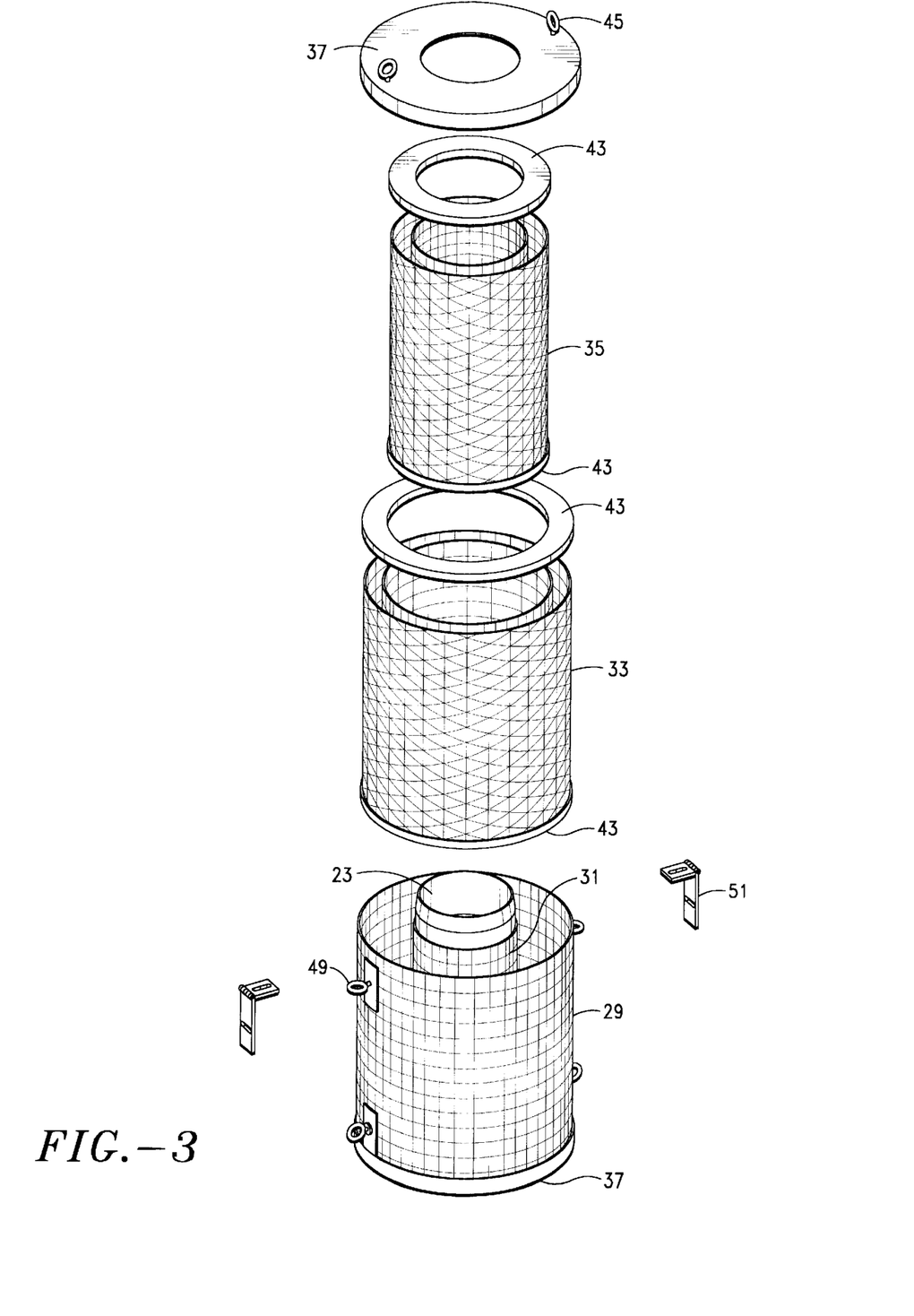
FIG. 3 is an exploded view thereof.

FIGS. 1, 2, and 3 illustrate a flow through drain filter assembly for a stormwater or wastewater sewer system inlet, or a dedicated water treatment catch basin, as contemplated by the present invention. It is provided for multiple filter operations: separating trash from stormwater or wastewater runoff; precipitating sediment suspended therein; removing liquid hydrocarbons that are suspended or floating therein; and deionizing the stormwater or wastewater to remove dissolved metal ions. The filter is a universal double flow design for catch basins having inlet flow either at the top of the basin or from a side inlet pipe and an outlet drain disposed either at the bottom or a side thereof.

Figure 6:
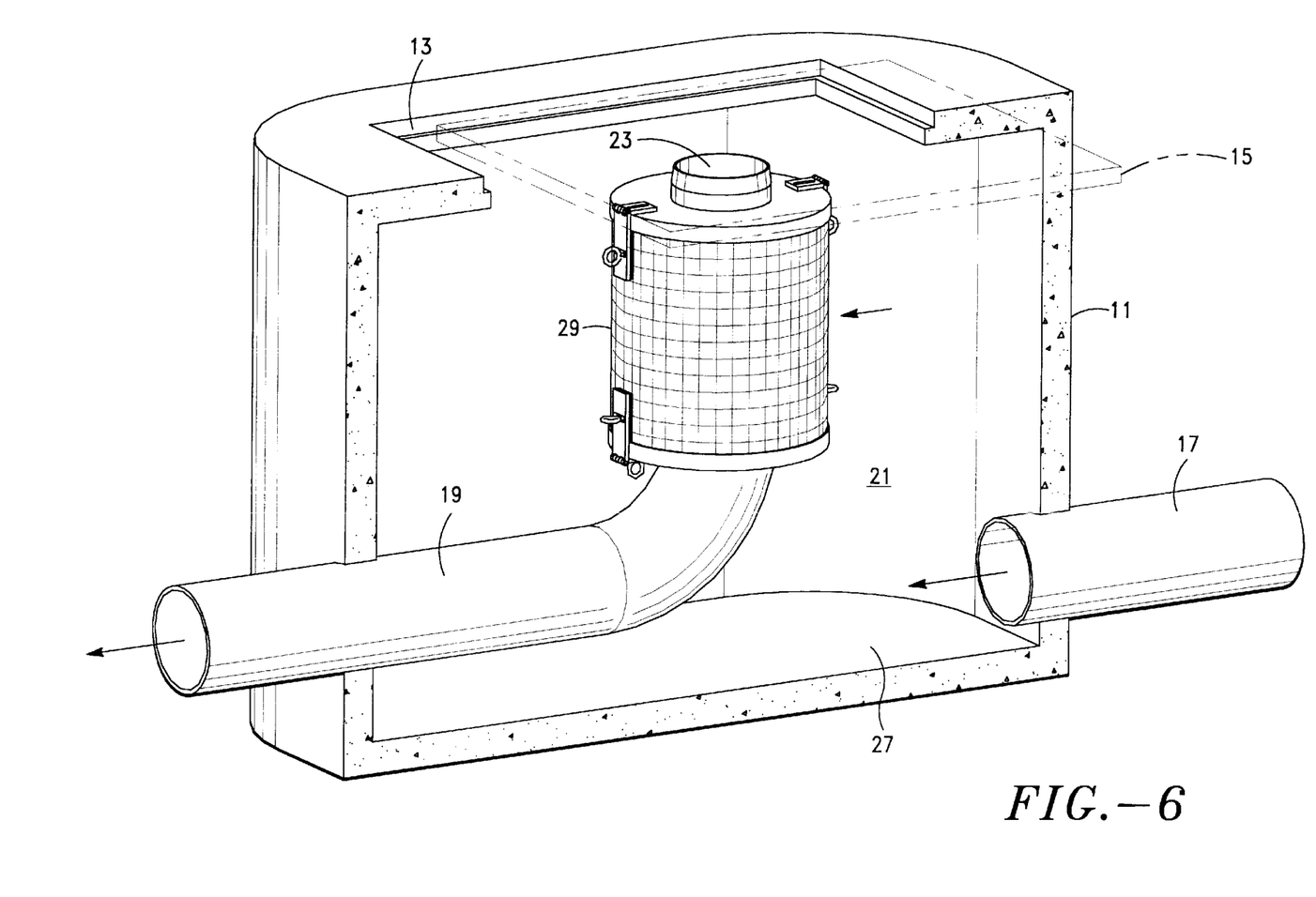
FIG. 6 is a perspective view in partial section of a stormwater or wastewater catch basin employing a flow through drain filter of the present invention in a first preferred orientation.
Figure 7:
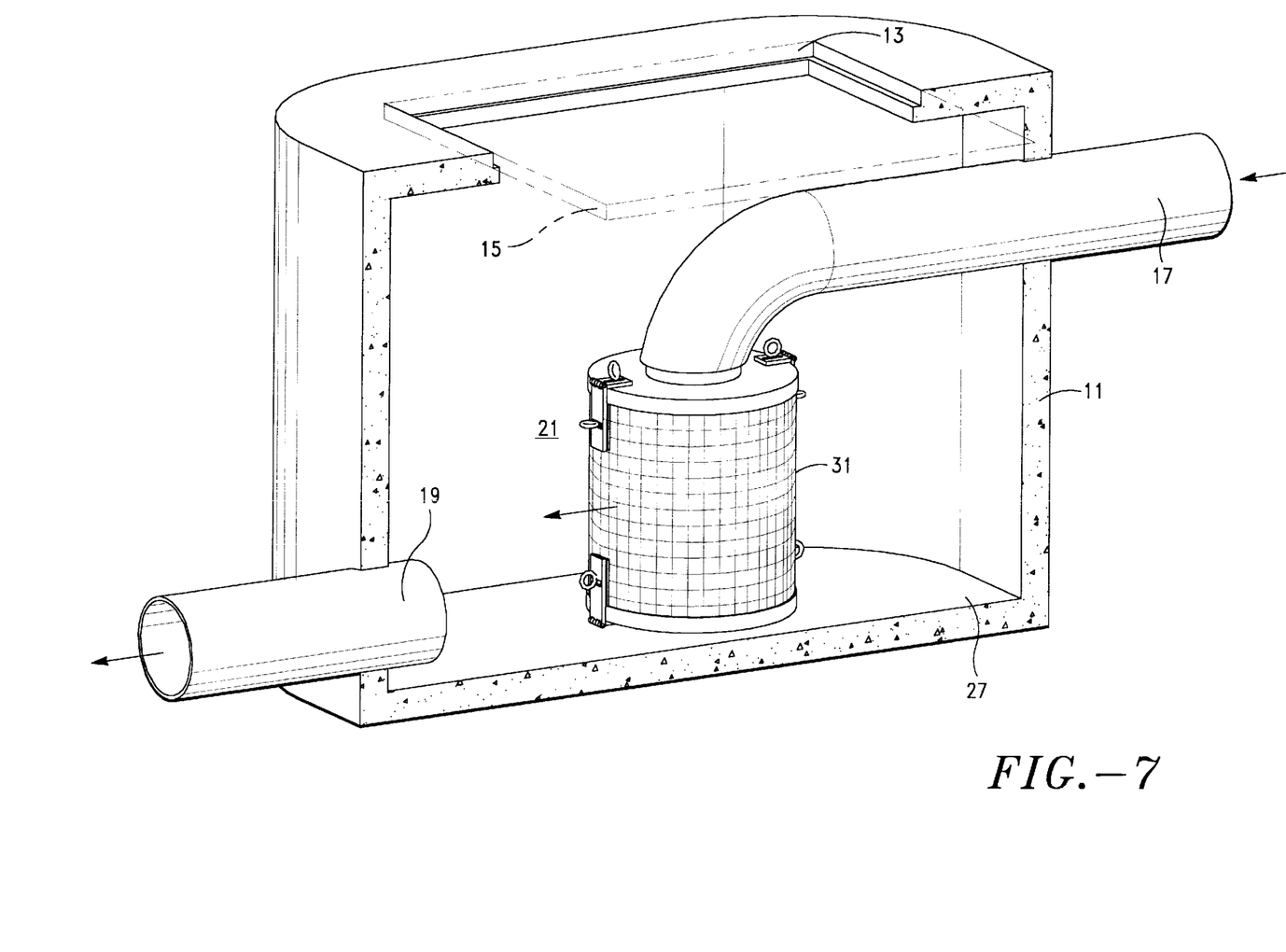
FIG. 7 is an alternative installation of the present invention to that shown in FIG. 6.
Figure 8:
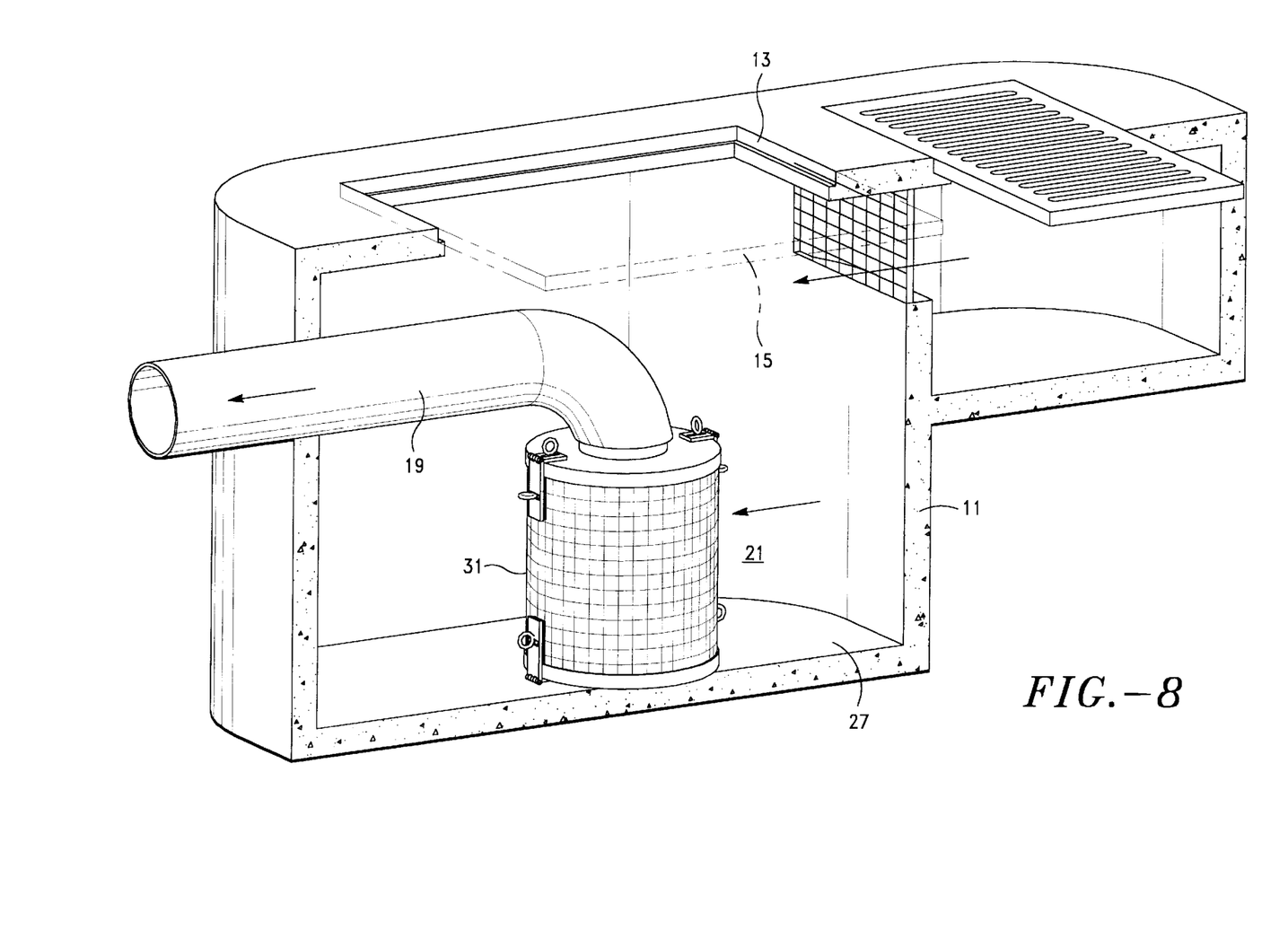
FIG. 8 is yet another installation thereof.
Figure 9:
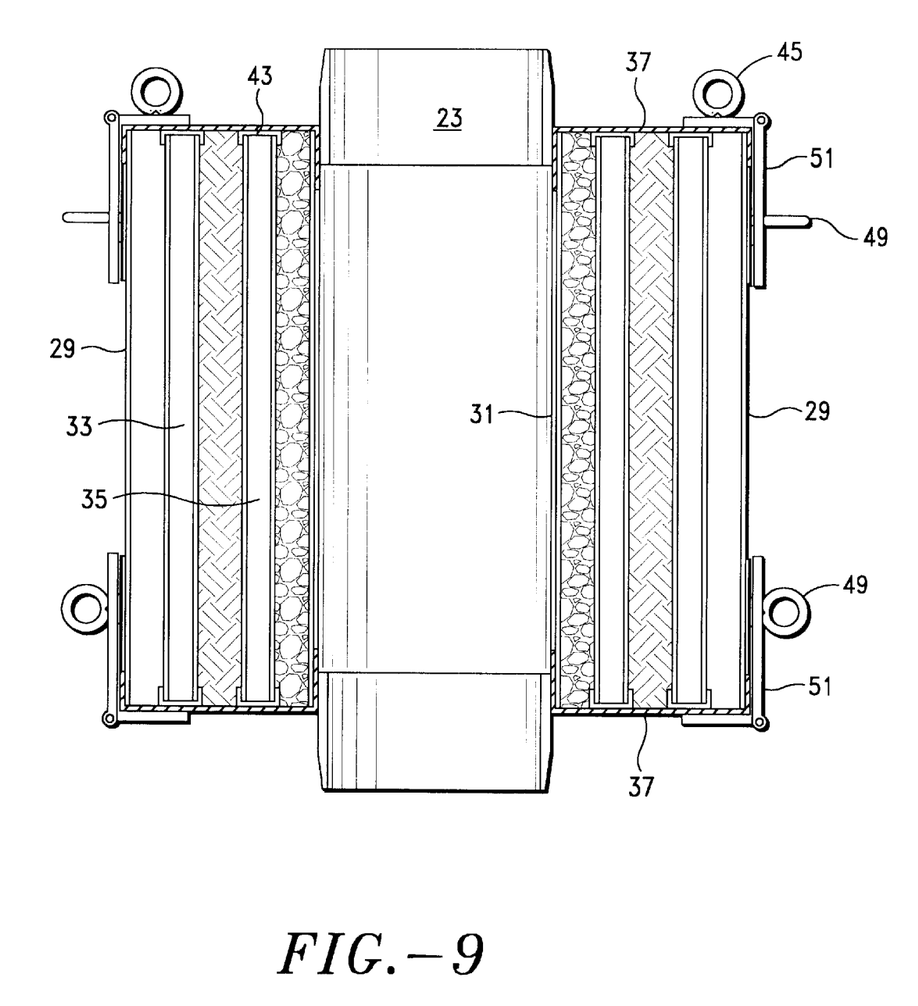
FIG. 9 is a side elevation in cross-section of the present invention.

The filter assembly of the present invention is uniquely versatile for the reason that it is a double flow design: either inflow or outflow. In the inflow design, the flow of the water is from external and surrounding the filter inward to a central drain as shown in FIGS. 6 and 8. In the outflow design, the flow of water is directed into the center of the filter which then flows outward therefrom to an external drain as shown in FIG. 7. The filter can be altered in the field for either direction of flow. The layering of the filter materials is simply reversed from one flow direction to the other. The filter can be installed in either old or new sewer inlets or in dedicated catch basins.

A sewer system inlet or drain for stormwater or wastewater is usually comprised of a catch basin with a cover grate, screen, or plate combination to exclude large debris and to prevent persons and objects from falling into the catch basin. Reference is made to FIGS. 6–8 which show a typical concrete box 11 formed with an opening 13 at the top for the inlet of water and the installation of a grate or cover plate 15 shown in phantom. The same construction can be utilized for a dedicated catch basin except for the fact that they usually have an inlet pipe 17 as shown in FIG. 6 and a cover plate as opposed to a water inlet grate.

Water inflow to a stormwater or wastewater catch basin is around the top opening thereof through the cover grate. An outflow or outlet from the catch basin to the sewer system is disposed at the bottom or a side of the basin and usually is in the form of a circular outlet drain pipe 19. It is located at a lower elevation in the catch basin than the inlet whereby water flow through the catch basin is by gravity.

An inflow filter 21 of the present invention is generally situated in a stormwater or wastewater catch basin 11 attached to the outlet drain 19 as shown in FIGS. 6 and 8. Water flow through the filter is from the area surrounding the filter inward to the center 23 of the filter and to its attachment to the outlet drain. FIG. 6 shows the usual installation and orientation arrangement for the filter, but in the usual case, the inlet for the stormwater or the wastewater is from the top of the catch basin through an inlet grate and not from a side entry pipe 25, as would be the case for a dedicated catch basin. The stormwater or wastewater falls to the bottom of the catch basin outside the circumference of the filter, except possibly in heavy storm conditions, and rises in the catch basin until it flows into and through the filter to the drain pipe.

In the usual installation as shown in FIG. 6, the top of the drain filter 21 can be left open to allow overflow to pour directly down the center 23 of the filter into the outlet drain 19 rather than flooding the catch basin 11. The overflow capability is designed to permit unfiltered water to be directed into the sewer system inlet in the event that large volume flows of stormwater effluent are preferred to bypass the filter, and drain through the overflow drain pipe, rather than overflowing the catch basin.

Alternatively, a drain filter 21 for a stormwater or wastewater catch basin 11 can be installed and oriented as shown in FIGS. 7 and 8, but overflow will flood and exit the catch basin However, the orientation of the filter in the shown position is desirable for certain installations. FIG. 7 shows an outflow type of filter. The alternative catch basin design of FIG. 8, as opposed to the catch basin design of FIG. 6, has proven to be desirable for certain types of trash and sediment in stormwater and for ease of clean-out.

Dedicated catch basins, as opposed to stormwater or wastewater drains, are designed to be interposed in a fluid flow, such as a sewer pipe, where the pipe line is interrupted for installation of a filter as shown in FIGS. 6 and 7. The inlet and outlet pipes to the catch basin are generally at the same level but with a specific gradient to insure gravity flow out of the catch basin into the outlet pipe. An inflow filter is usually connected to the outlet pipe as shown in FIG. 6 and the water flow to the filter from the catch basin is laterally inward to the center thereof and outflow therefrom is from the center of the filter to the drain outlet. The filter orientation of some dedicated installations is required as shown in FIG. 7.

In a catch basin 11 for surface water runoff, small debris, suspended sediment, liquid hydrocarbons, and metal ions in stormwater or wastewater, which pass through the cover grate of the basin, either precipitate to the bottom thereof 27 or, in the usual case, outflow the catch basin through the sewer system drain pipe 19. In a dedicated catch basin, the water flow may already have been filtered for trash. It is the purpose of the present invention to capture the flow of those contaminants which enter either type of catch basin and prevent them from outflowing therefrom, thereby filtering the water before it enters the sewer system or environment Reference is made to FIGS. 1–3 which show a preferred generic embodiment of the drain filter of the present invention which can be utilized for either direction of water flow. The basic elements of the drain filter 21 include a container having at least four concentric spaced apart screen elements disposed in the catch basin and arranged to filter water flowing to the basin outlet. The language of the claims appended hereto describes either an inward flow filter or the alternative outward flow filter. The layering of the filter elements in the alternative embodiment is reversed from the first preferred embodiment arrangement but the generic structures are identical. In order to place numbers on the parts of the filter for description, the inward flow design will be described, but the middle screen names are interchangeable in order to cover both directions of flow in the claims. The four screen elements in the assembly include: a water intake trash exclusion screen 29; a water exit screen 31; and first and second middle screens 33, 35.

The screen elements divide the interior of the filter container into three layered compartments. Water containing the contaminants passes through the container for sequential treatment in either the first preferred or the alternative preferred embodiments of the invention. The direction of flow utilized in either embodiment depends upon the inlet and outlet configurations of the catch basin. Most stormwater and wastewater catch basins are designed with an inlet for water inflow around the top periphery of a hole in the ground or pavement with side or bottom drains whereby the flow through the water filter is usually inward. Reverse flow occurs if water is inletted to the center of the filter and drains to the exterior of the filter. By passing through the succession of screens, either inward or outward, the water must pass through different filter materials disposed separately in each of the three compartments formed by the concentric screens in a specific sequential preference.

The space between the second middle concentric screen 35 and adjacent to the exit screen 31 contains material for removing metal ions from the water flow. Another space formed between the middle screens 33,35 contains material for removing hydrocarbons, and the remaining space between the first middle screen 33 and adjacent to the water inlet screen 29, which is also a trash exclusion screen, traps sediment In the preferred embodiment of the process method of the invention, the contaminated water flow, whether inward or outward through the filter, is first filtered to exclude trash. It is then filtered to trap sediment and it is next filtered to remove hydrocarbons. It is last filtered to remove metal ions. Therefore, the specific location of the filter media in the container, between the sets of screen elements, depends upon the direction of water flow through the filter.

In order to prevent liquid hydrocarbons from contaminating or saturating the metal ion filtering media, it is necessary to filter the water flow for liquid hydrocarbons before it passes through the metal ion filter, so the liquid hydrocarbon filter must be placed in the water flow in front of the metal ion filter.

In the simplest configuration for manufacture of the present invention, the screens are cylindrical, but any configuration of spaced apart screens which can be accommodated by the configuration of the catch basin will function provided the spacing between the screens is adapted for containing the materials as described hereafter. The screen spacing is determined by trial and error based on the type of water to be filtered in order to permit adequate amounts of absorbent materials to be disposed between the successive screens for the exclusion of sediment and trapping the liquid hydrocarbons and metal ions from the water flow. While the spacing distance between the screens essentially determines the thickness of each absorbent layer, it in turn determines the length of the life cycle of the absorbency of the filter materials. The distance between the screens therefore can be varied considerably depending upon the water flow rate, sampled stormwater or wastewater components, and time considerations for servicing the filter.

Trial and error testing has suggested that a lesser volume of metal ion filtering material is needed for stormwater than hydrocarbon filter material so that in the case of an inward flow of water through a filter, the inner smaller volume chamber is ideally adapted to the metal ion filtering process. It has been determined that generally for a stormwater drain for street water, a cylindrical inflow filter having essentially equally thick filter media chambers proves to be satisfactory for approximately equal life cycles of the materials.

In the preferred embodiment of an inflow filter of the present invention, a pair of cylindrical spaced apart inner 31 and outer 29 screens are positioned with their top and bottom edges disposed at the circular peripheral edges of a container end plate 37 in the form of an annular disk. The larger outer cylindrical screen is attached to or contained within the outer edge 39 of the disk or base plate, and the smaller inner cylindrical screen is attached to or contained within the edge 41 of the central hole of the plate. One of the screens forms the water exit screen and the other forms the trash exclusion screen depending upon the direction of water flow. The inner and outer screens could be permanently secured to the respective peripheral edges of the end plate annular disk, but in a preferred embodiment of the invention, those edges are provided with flanges to mechanically retain the screens in position. Both end plates can be identical for efficiency of manufacture.

In the preferred inflow embodiment of the invention, a pair of concentric middle screens 33, 35 are nested between the inner and outer screens 29, 31. The middle screens are shown as formed as two sets of double nested cylindrical screens with each set joined together at their ends by annular end plates 43 whereby each set of middle screens forms a generally uniformly configured cylindrical hollow-walled tube. The hollow walls of the tubes form two interstitial areas which function in the filters to permit water passing through the filter to mix intermittently at the interstitial areas during the passage through the filter. The interstitial areas provide the important function of allowing water to circulate therein to avoid filled up portions of the following or next screen in the filter process.

Only the second middle screen 35 which is interposed between the liquid hydrocarbon absorber and the metal ion filter material benefits entirely from the interstitial space for water circulation provided by the double-walled screen. A single-walled screen is sufficient to contain and separate the hydrocarbon absorber from the particulate separation chamber disposed between the first middle screen 33 and the water inlet screen 31. However, both of the two middle screens are usually made double-walled in order to make the filter a universal model for either an inflow or outflow installation or the water flow reversible and the filter material placement interchangeable. For specific installations, in which the water flow direction will be constant, only a single double-walled middle screen is needed between the two filter materials.

In the generic preferred embodiment of the invention, the space between the water exit screen and the second middle cylindrical screen contains the filter material for removing metal ions from the water flow. The space between the first and second middle screens contains material for removing hydrocarbons. The remaining space between the first middle screen and the trash exclusion screen traps sediment which cannot pass through the relatively solid hydrocarbon absorbent material. The trash exclusion screen which admits the flow of water to the filter, generally has a larger mesh than the sets of middle screens which contain the hydrocarbon or metal ion removal materials.

In the preferred inflow embodiment of the invention, where the water flow is inward to the center of the filter, the space between the water exit screen at the center of the filter and the smaller second set of middle screens contains the filter material for removing metal ions. The space between the first and second or larger and smaller sets of middle screens, respectively, contains the material for removing hydrocarbons. The space between the first or larger middle screen and the external trash exclusion screen collects the sediment.

In the alternative preferred outflow embodiment of the present invention, where the water flow is outward from the center of the filter, the space between the inner water intake screen and the second and smaller diameter cylindrical middle screens catches sediment which cannot pass through the hydrocarbon material. The space between the middle sets of screens contains the material for removing hydrocarbons, and the space between the larger middle set of screens and the outer exit screen contains material for removing metal ions from the water flow.

The metal ion filter material disposed between the exit screen and the adjacent set of middle screens can be comprised of a metal recovery ion exchange media filter which, if of the preferred premium type, can be backwashed with a regenerating solution to reactivate the media. Typical forms of ion exchange media filters commercially available are resin balls and zeolites which are of a very wide range of both natural and synthetic origin. The terms "molecular sieves," "base exchangers," "organic solvents," "cellulose," and "chelates" all describe different sections of media filters in this wide range of products. Some have a crystalline form with a small pore structure. Others are granular grades especially utilized in water treatment applications. All are especially designed for the removal of heavy metal ions in solutions or suspension in waste or stormwater. Chelates are chemicals which will perform chelation defined as the reaction between a metal ion and the complexing agent resulting in the formation of ring structures which incorporate the ion. A new class of materials called polyelectrolytes is starting to be used in place of chelates for the same purpose.

The hydrocarbon filter material or media of the present invention disposed between the two inner first and second middle screens, in either embodiment of the invention, is a continuous layer of porous particulate which is hydrophobic and a liquid hydrocarbon absorber. The particulate is not so porous as to permit the passage of sediment and prevents its passage through the filter whereby it precipitates to the bottom of the filter assembly between the trash exclusion screen and the adjacent middle screen. The liquid hydrocarbons suspended in the water either float to the surface thereof in the basin or, in turbulent flow, may remain suspended in the water. In either case, when they contact the hydrocarbon absorbent particulate by the outflow movement of the water in the catch basin through the filter toward the outlet, they are absorbed thereby and prevented from flowing through the outlet into the sewer system inlet The particulate in the preferred embodiment of the invention is comprised of a compressed fiber paper tissue manufacturing byproduct having a surfactant added thereto which makes the fibers hydrophobic and liquid hydrocarbon absorbent. Other materials providing similar surface area and which function similar to particulates and are hydrophobic and liquid hydrocarbon absorbent or adsorbent, of which there are numerous alternatives, would serve as a satisfactory substitute. The porosity of the particulate allows the water in the catch basin to flow through the layer whereby the liquid hydrocarbons carried with it are brought into contact with the filter media contained between the middle sets of screens and absorbed thereby.

Large debris in stormwater runoff or wastewater is prevented from dropping into the catch basin by a surface level grate or is previously separated from the water flow entering a filter basin. A sediment chamber in the catch basin or filter basin surrounding the filter collects some of the heavier sediment from the water inflow to the catch basin which precipitates outside of the filter. The trash exclusion screen of the filter stops the flow of some of the floating and larger debris in stormwater which falls into a catch basin through the top grate and does not sink. The sediment collection receptacle or catch space is provided in the filter by the spacing between the trash exclusion screen and the first middle screen and is an important feature of the invention which functions as a specific separate sediment collection receptacle. The sediment chamber has been found to be effective in preventing rapid clogging of the filter material disposed inside the middle screens.

A finer mesh in the middle screens than the trash exclusion screen prevents further progress of non-filtered floating debris, and, as described earlier, the filter material disposed between the two middle screens stops further progress of suspended particles most of which eventually fall to the bottom of the filter separation chamber, between the trash exclusion screen and the first middle screen, when the catch basin dries out. The sediment separation chamber space is easily cleaned during periodic servicing of the filter.

In the simplest configuration, when the middle filter screens are filled with the filter materials, they are effectively fixed in position with respect to each other. Alternatively, they can be interconnected or positioned in the assembly by the pair of container end plates 43, at least one or both of which are removable. Therefore, the inner, outer, and middle screens can all be separated and held in position by flanges on the end plates and the internally packed filter materials. Either end of the inner screens could be provided with connectors to secure them with respect to the end plates or the end plates could be provided with internal circular flanges similar to the annular edge flanges to position the inner screens. The upper end of the inner screen can be formed to project out of the filter barrel, as shown in FIG. 1, to provide a mount for an overflow trash screen.

One of the end plates can be provided with a fitting such as a collar so that it can be attached to the catch basin outlet pipe or drain, or an intake pipe, depending upon the filter flow direction. Either end plate can be formed to perform either function or both. Usually the inlet flow to a catch basin is at the top thereof as shown in FIGS. 6 and 8, but sometimes as is usual with a dedicated filter basin, the inlet is horizontal or an angulated pipe as shown in FIGS. 6 and 7. In either case, however, the filter screens are oriented with their concentric cylindrical axes aligned vertically. The inflow from a side inlet is sometimes piped to the center of an outflow filter as shown in FIG. 7, and sometimes the outflow is from the center top of the filter through an exit pipe as shown in FIG. 8. Only if the filter is upright and attached to the outlet drain can the top end plate be annular to provide an overflow opening to permit flood water to go directly down the outlet drain as shown in FIG. 6.

Figure 4:
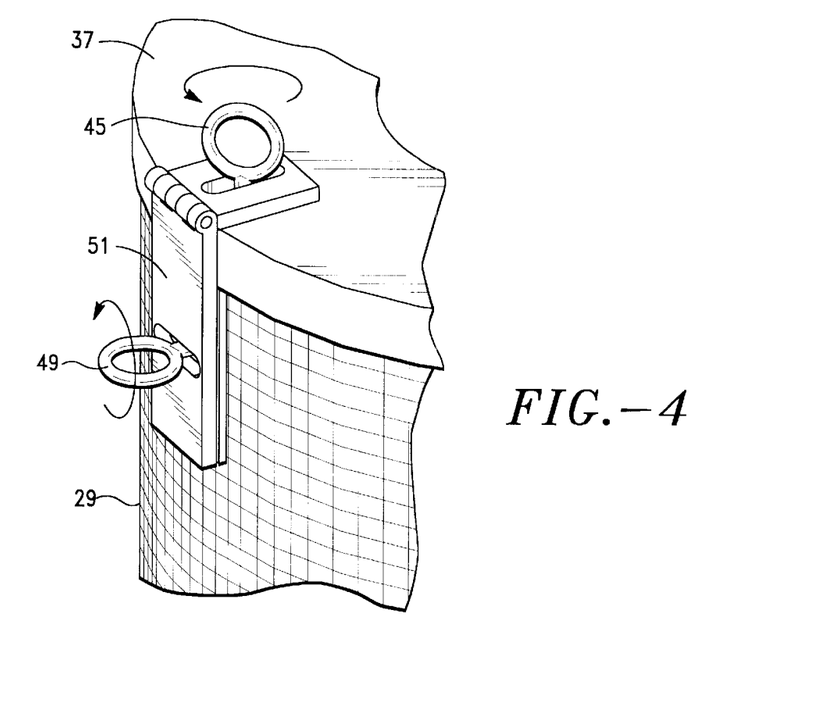
FIG. 4 is a partial perspective view thereof showing the latch and locking mechanism for the filter end plates.
Figure 5:
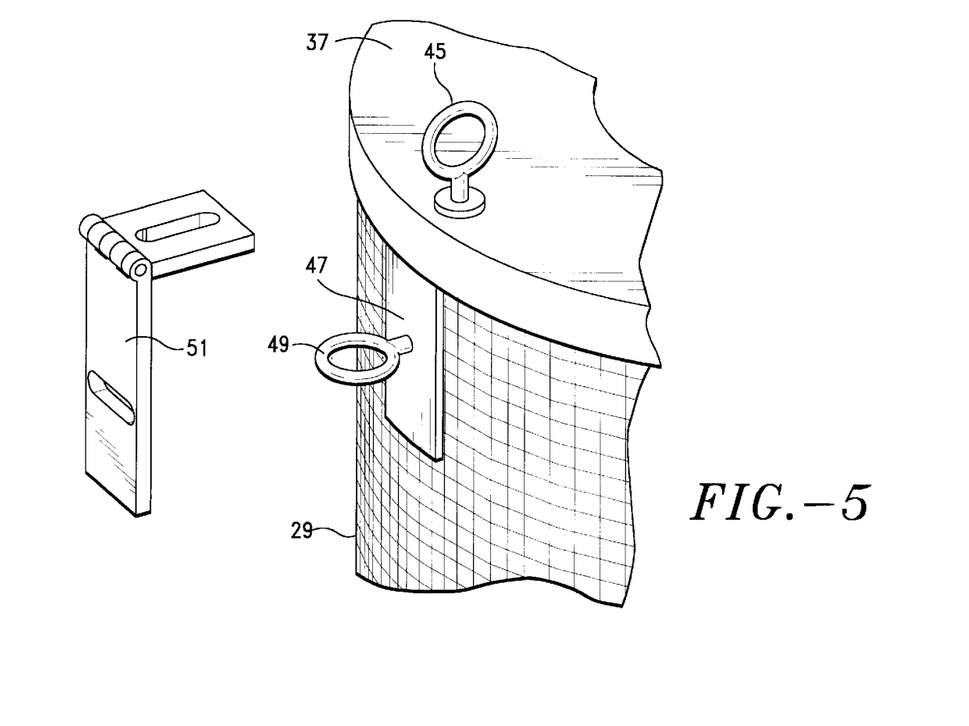
FIG. 5 is an alternative view of FIG. 4 showing the latch mechanism unlocked.

Attachment fittings are provided to hold the end plates 43 in position on the ends of the cylindrical screens. Reference is made to FIGS. 4 and 5. In a preferred embodiment of the invention, the end plates and their attachment fittings can be made identical and of common hardware for cost effectiveness. One of the end plates can be modified in the field for attachment to, and sealing with, the particular intake or drain pipe in the particular catch basin or containment vessel in which the filter is to be installed.

The end plates 43 can be provided with attachment fittings such as eyelets 45 and the outer screens 31 with sidewall plates 47 having corresponding attachment fittings 49. A hinged locking plate 51 or bent strap metal, preferably of noncorrosive materials, can be made to engage the fittings of the end and sidewall plates to lock the end plates onto the outer cylindrical screen thereby capturing the inner and middle screens between the end plates. Any other suitable fittings or attachment mechanisms, of which many would be obvious to one skilled in the art, can be utilized to interlock the end plates and capture the screens.

When a filter of the present invention is disposed surrounding the outlet drain of a catch basin which forms an inlet to a sewer system, whereby the filter is discharging into the sewer system inlet, stormwater or wastewater flowing into the catch basin permits sediment washed thereinto therewith to either precipitate to the bottom of the catch basin for subsequent removal or be filtered out by the trash exclusion intake screen or the filter media particulate. Sediment which is precipitated into the bottom of the catch basin can be extracted from the tank periodically in the dry periods by mechanical means or vacuum removal. Concurrently, the filter apparatus can be removed from the catch basin and disassembled at surface level to facilitate sediment removal and the filter media exchange.

When it is time to clean the catch basin and the filter, the cylindrical barrel of the filter assembly can be detached from the catch basin water inlet or drain outlet and lifted out of the basin and set upright with the cylindrical axis vertical. The catch basin can easily be cleaned of large sediment and trash any time after the filter has been removed. The top end plate of the filter is removed, and the filter assembly can be disassembled in any order. The screens can each be easily sequentially removed from the filter facilitating the removal of accumulated sediment and sodden and coagulated particulate. The sediment which has accumulated between the first middle screen and the trash exclusion screen can be removed before or after the middle screens have been removed or when the bottom plate is removed.

Normally, the trash exclusion screen adjacent to the sediment chamber in the filter is first lifted out or off and the loose sediment in the collection chamber removed. The exit screen is then removed and the metal ion filter material retrieved for regeneration. The middle screens remain and they can then be removed together and taken to a cleaning area and separated whereby the saturated particulate hydrocarbon filter material between the screens can be removed and the screens cleaned.

The filter screens are reassembled and then the fresh filter materials inserted. Partial reassembly of the four concentric screens with one end plate permits the fresh and regenerated particulate to simply be poured into the annular spaces between the sets of screens.

The present invention also includes the method of removing trash, sediment, liquid hydrocarbons, and metal ions from stormwater or wastewater washed into sewer system inlets having catch basins with an outlet drain. The steps comprise: interposing a filter in the catch basin between the sewer system inlet and the outlet drain. The filter sequentially removes from the water flow through the filter: first, trash in the water flow by a trash exclusion screen; second, sediment in the water flow by interposing a water permeable sediment barrier between concentric first and second middle screens in the filter; third, liquid hydrocarbons in the water flow by interposing a particulate filter which is hydrophobic and liquid hydrocarbon absorbent between the first and second middle screens; and fourth, metal ions by interposing in the water flow a deionizing resin bead barrier between the second middle screen and a water exit screen. The trash screen, sediment barrier, liquid hydrocarbon particulate filter, and the deionizing resin bead barrier are arranged in concentric relation in nested cylindrical porous retainers. As a result, stormwater or wastewater flowing into the catch basin must pass through the concentric screens whereby sediment and suspended matter flowing into the tanks with the stormwater are precipitated or filtered out of the water and liquid hydrocarbons floating or suspended in the stormwater are captured by being absorbed into the particulate and metal ions in the stormwater are removed before the filtered water discharges from the catch basins into the sewer system inlet Thus, it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. A flow through drain filter assembly for a stormwater or wastewater catch basin forming a sewer system inlet and having a gravity flow basin outlet drain, said filter assembly being formed for excluding floating trash and capturing sediment, liquid hydrocarbons, and free metal ions washed into said sewer system inlet by stormwater or wastewater, said filter assembly comprising at least four concentric spaced apart screens disposed in said assembly and arranged to filter water flowing to said outlet, said assembly including a water intake trash exclusion screen and a water exit screen and first and second middle screens, said assembly including deionizing resin beads disposed between said water exit screen and said second middle screen, and particulate filter material which is hydrophobic and a liquid hydrocarbon absorber disposed between said first and second middle screens, whereby water flowing into said sewer system inlet passes through said filter assembly and trash is separated from said water by said trash exclusion screen and suspended sediment washed thereinto therewith is precipitated to the bottom of said filter between said trash exclusion screen and said first middle screen, and liquid hydrocarbons suspended in said water are absorbed by contact with said particulate matter disposed between said first and second middle screens, and free ions are deionized by contact with said resin beads disposed between said second middle and said exit screens by the outflow movement of said water in said basin through said screens to said outlet whereby trash, sediment, hydrocarbons, and free ions are thereby separated, precipitated, absorbed and deionized sequentially by said assembly and its ingredients and prevented from flowing through said outlet and into said sewer system.

2. The drain filter of claim 1 wherein the direction of water flow through said filter is from external thereto from said catch basin surrounding said filter and flowing inward to the center of said filter thereby funneling said water flow into a bottom outlet drain of said basin.

3. The drain filter of claim 1 wherein the direction of water flow through said filter is from water inlet into the center thereof outward through said filter thereby releasing said water flow into said catch basin surrounding said filter.

4. The stormwater drain filter of claim 3 wherein said screens are cylindrical and oriented with their cylindrical axes aligned vertically and the upper ends of said screens are capped by an overflow screen whereby an excess flow of water can bypass said filter through the center thereof.

5. The drain filter of claim 1 wherein said particulate filter material is comprised of a compressed fiber having a surfactant added thereto which renders said fibers hydrophobic and liquid hydrocarbon absorbent.

6. The stormwater drain filter of claim 1 wherein said screens are cylindrical and interconnected by end plates at least one of which and said middle screens are removable.

7. The drain filter of claim 1 wherein at least said middle screen disposed between said resin beads and said hydrocarbon absorber is double-walled forming an interstitial space therebetween.

8. A flow through drain filter assembly for a stormwater or wastewater catch basin forming a sewer system inlet and having a gravity flow basin outlet drain disposed at the bottom thereof, said filter assembly being formed for excluding floating trash and capturing sediment, liquid hydrocarbons, and free metal ions washed into said sewer system inlet by stormwater or wastewater, said filter assembly comprising at least four concentric spaced apart cylindrical screens disposed in said assembly and arranged to filter water flowing to said bottom outlet, said assembly including an outer water intake trash exclusion screen and an inner water exit screen and first and second middle screens, at least said second middle screen being double-walled forming an interstitial space therebetween, said screens being interconnected by end plates at least one of which and said middle screens being removable, said screens being oriented with their cylindrical axes aligned vertically, said assembly including particulate filter material comprised of a compressed fiber having a surfactant added thereto and which is hydrophobic and a liquid hydrocarbon absorber disposed between said first and second middle screens, and deionizing resin beads disposed between said water exit screen and said second middle screen, whereby water flowing into said sewer system inlet passes through said filter assembly and trash is separated from said water by said trash exclusion screen and suspended sediment washed thereinto therewith is precipitated to the bottom of said filter between said trash exclusion screen and said first middle screen, and liquid hydrocarbons suspended in said water are absorbed by contact with said particulate matter disposed between said first and second middle screens, and free ions are deionized by contact with said resin beads disposed between said second middle and said exit screen by the outflow movement of said water in said filter through said screens to said outlet drain whereby trash, sediment, hydrocarbons, and free ions are thereby separated, precipitated, absorbed and deionized sequentially by said assembly and its ingredients and prevented from flowing through said outlet and into said sewer system.

9. The flow through drain filter of claim 8 wherein the upper ends of said screens are capped by an overflow screen whereby an excess flow of water can bypass said filter through the center thereof.

10. A flow through drain filter assembly for a stormwater or wastewater catch basin forming a sewer system inlet and having a gravity flow basin outlet drain, said filter assembly being formed for excluding floating trash and capturing sediment, liquid hydrocarbons, and free metal ions washed into said sewer system inlet by stormwater or wastewater, said filter assembly comprising at least four concentric spaced apart cylindrical screens disposed in said assembly and arranged to filter water flowing to said outlet, said assembly including an inner water intake trash exclusion screen and an outer water exit screen and first and second middle screens, at least said second middle screen being double-walled forming an interstitial space therebetween, said screens being interconnected by end plates at least one of which and said middle screens being removable, said screens being cylindrical and oriented with their cylindrical axes aligned vertically, said assembly including deionizing resin beads disposed between said outer exit screen and said second middle screen, and particulate filter material comprised of a compressed fiber having a surfactant added thereto and which is hydrophobic and a liquid hydrocarbon absorber disposed between said first and second middle screens, whereby water flowing into said sewer system inlet passes through said filter assembly and trash is separated from said water by said trash exclusion screen and suspended sediment washed thereinto therewith is precipitated to the bottom of said filter between said trash exclusion screen and said first middle screen, and liquid hydrocarbons suspended in said water are absorbed by contact with said particulate matter disposed between said first and second middle screens, and free ions are deionized by contact with said resin beads disposed between said second middle and said exit screen by the outflow movement of said water in said basin through said screens to said outlet drain whereby trash, sediment, hydrocarbons, and free ions are thereby separated, precipitated, absorbed and deionized sequentially by said assembly and its ingredients and prevented from flowing through said outlet and into said sewer system.

11. A method for removing trash, sediment, liquid hydrocarbons, and free metal ions from stormwater or wastewater flowing into sewer system inlets having catch basins with an outlet drain, said method comprising interposing a filter in said catch basin between said sewer system inlet and said outlet drain, sequentially removing from the water flow through said filter
- trash in said water flow by a water intake trash exclusion screen,
- sediment in said water flow by interposing a water permeable sediment barrier between concentric first and second middle screens in said filter,
- liquid hydrocarbons in said water flow by interposing a particulate filter which is hydrophobic and liquid hydrocarbon absorbent between said first and second middle screens, and
- metal ions by interposing in said water flow a deionizing resin bead barrier between said second middle screen and a water exit screen, said trash screen, said sediment barrier, said liquid hydrocarbon particulate filter, and said deionizing resin bead barrier being arranged in concentric relation.

12. The method of claim 11 wherein said trash screen, said sediment barrier, said particulate filter, and said bead barrier are arranged in nested cylindrical porous retainers.

* * * * *